(12) United States Patent
Harper et al.

(10) Patent No.: US 6,934,108 B2
(45) Date of Patent: Aug. 23, 2005

(54) SERVO PATTERN BASED TAPE TENSION CONTROL FOR TAPE DRIVES

(75) Inventors: David H. Harper, San Jose, CA (US); Mark A. Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 10/349,307

(22) Filed: Jan. 22, 2003

(65) Prior Publication Data

US 2004/0141250 A1 Jul. 22, 2004

(51) Int. Cl.$^7$ .............................. G11B 15/18
(52) U.S. Cl. ...................................... 360/71
(58) Field of Search ......................... 360/71, 53, 48, 360/75, 77.12, 78.02; 242/357

(56) References Cited

U.S. PATENT DOCUMENTS

| | | | |
|---|---|---|---|
| 3,829,038 A | 8/1974 | Studer | 242/190 |
| 4,156,257 A | 5/1979 | Roberts | 360/71 |
| 4,438,891 A | 3/1984 | Wiig | 242/190 |
| 4,977,466 A | 12/1990 | Nakata | 360/73.08 |
| 5,032,936 A | 7/1991 | Fujioka et al. | 360/71 |
| 5,216,556 A | 6/1993 | Steinberg et al. | 360/74.3 |
| 5,241,434 A | 8/1993 | Okamoto et al. | 360/77.14 |
| 5,477,399 A | 12/1995 | Honjo et al. | 360/73.07 |
| 5,602,688 A | 2/1997 | Yokoyama et al. | 360/69 |
| 5,639,040 A | 6/1997 | Honjo | 242/334 |
| 5,689,384 A * | 11/1997 | Albrecht et al. | 360/77.12 |
| 5,717,537 A | 2/1998 | Watanabe et al. | 360/74.4 |
| 5,963,400 A * | 10/1999 | Cates et al. | 360/317 |
| 6,021,013 A * | 2/2000 | Albrecht et al. | 360/53 |
| 6,082,653 A * | 7/2000 | Abedor et al. | 242/357 |
| 6,166,870 A * | 12/2000 | Cates et al. | 360/48 |
| 6,282,051 B1 * | 8/2001 | Albrecht et al. | 360/75 |
| 6,320,719 B1 * | 11/2001 | Albrecht et al. | 360/77.12 |
| 6,542,325 B1 * | 4/2003 | Molstad et al. | 360/77.12 |
| 6,580,581 B1 * | 6/2003 | Bui et al. | 360/78.02 |

* cited by examiner

*Primary Examiner*—David Hudspeth
*Assistant Examiner*—Fred F. Tzeng
(74) *Attorney, Agent, or Firm*—Walter W. Duft

(57) ABSTRACT

A system and method of controlling tape tension during operation of a tape drive by making use of pre-existing timing based servo patterns formatted on the media. Changes in servo pattern timing are read at regular intervals and used to calculate changes in tension, with the torque of the tape reel motors being adjusted accordingly.

30 Claims, 6 Drawing Sheets

SERVO PATTERN BASED TAPE TENSION CONTROL FOR TAPE DRIVES

BACKGROUND OF THE INVENTION

1. Field of the Invention

This invention relates to tape drive data storage systems. More particularly, the invention is directed to the control of tape tension during tape drive operation to facilitate data read/write accuracy.

2. Description of the Prior Art

By way of background, during operation in a tape drive data storage apparatus, a tape medium is transferred from a supply reel to a take-up reel while data is read from or written to tape by one or more read/write heads. Typically, the tape medium and the supply and take-up reels are mounted inside a tape cartridge that is inserted into a slot in the tape drive so that the tape is in magnetic contact with the read/write heads. The tape is advanced past the read/write head(s) by means of a pair of motors, one for each reel, which drive the reels at a desired tape speed. The motor that drives the supply reel is sometimes called the trailing motor and the motor that drives the take-up reel is sometimes called the advance motor. Motion of the trailing motor is controlled relative to motion of the advance motor to provide the necessary tape tension for desired positioning between the tape and the read/write head(s). It is desirable to maintain constant tape tension for optimum performance of data transfer through the read/write head(s). Improper tape tension can lead to unreliable positioning of the tape relative to the read/write head(s), which can produce low readback signal amplitude and poor data transfer reliability, and causes poor stacking on the reels which can result in damaged media and therefore data loss.

In light of the foregoing, all modern tape drive data storage devices implement some form of tape tension control. Available options include tension transducers, estimation of the amount of tape on the reels, pack radius monitoring devices or pack radius estimating, tachometers, friction capstans and closed loop monitoring of motor current. These options can be insufficient in providing precise tension control and may require additional hardware in the tape path that can negatively contribute to high performance tape path requirements.

Other tape tensioning options include data readback signal monitoring and tape tension control as a function of data rate or signal level. A still further option includes monitoring of test signals recorded in a scratch area of the tape. These options are also undesirable because they require added hardware or additional write/read sequences for their implementation.

Accordingly, it is desired to have an improved method of adjusting tape tension in a tape drive data storage system.

SUMMARY OF THE INVENTION

The foregoing problems are solved and an advance in the art is obtained by a unique system and method of controlling tape tension during operation of a tape drive data storage system in which preexisting servo patterns on the tape medium are used in conjunction with servo timing analysis for tape tension control.

In exemplary embodiments of the invention, the tape tension control system and method is implemented within a modified servo control circuit. The tension control system is adapted to detect increases and decreases in the time between known servo patterns (servo timing) previously written on the tape medium, and generate tension control signals to adjust tape tension according to the servo timing changes. The tension control system is further adapted to adjust tension to the moving tape medium by controlling motor drive torque in accordance with the tension control signals.

The servo patterns on the tape medium are detected by a servo magnetic head and decoded by conventional circuitry for performing the usual servo control functions. In addition, a servo timing calculation is made and compared to predetermined nominal servo timing information representing the nominal time between two known servo pattern points on the tape medium at operational tape speed. If the comparison result is non-zero, the result is used to calculate a corresponding change in tape tension and a tension control signal. The tension control signal is sent to a motor driver circuit, which generates a corrective current change for controlling the relative speeds at which the take-up reel and the supply reel are rotated. This process can be repeated at regular intervals as the tape travels from the supply reel to the take-up reel.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF THE PREFERRED EMBODIMENT

Figure 1:
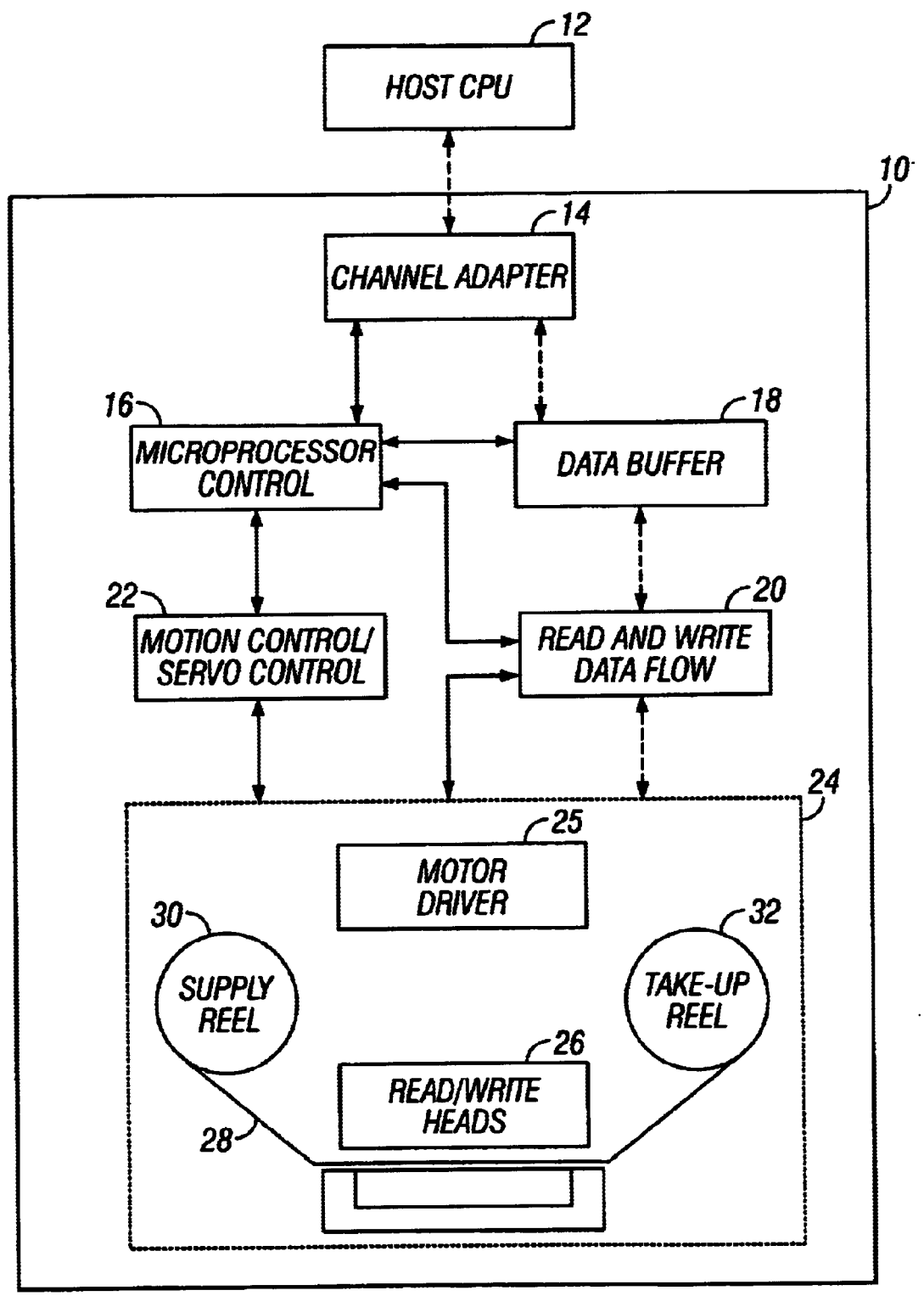
FIG. 1 is a functional block diagram showing a tape drive data storage device adapted for use with the present invention.

The invention will now be described by way of exemplary embodiments shown by the drawing figures (which are not necessarily to scale), in which like reference numerals indicate like elements in all of the several views.

Turning to FIG. 1, the inventive concepts herein described may be embodied in a tape drive data storage device (tape drive) 10 for storing and retrieving data by a host digital processing device 12, which could be a general purpose computer of other processing apparatus adapted for data exchange with the tape drive 10. The tape drive 10 includes plural components providing a control and data transfer system for reading and writing host data on a magnetic tape medium. Those components include a channel adapter 14, a microprocessor controller 16, a data buffer 18, a read/write data flow circuit 20, a motion control system 22, and a tape interface system 24 that includes a motor driver circuit 25.

The microprocessor controller 16 provides overhead control functionality for the operations of all other components of the tape drive 10. As is conventional, the functions performed by the microprocessor controller 16 are programmable via microcode routines (not shown) according to desired tape drive operational characteristics. During data write operations (with all dataflow being reversed for data read operations), the microprocessor controller 16 activates the channel adapter 14 to perform the required host interface protocol for receiving an information data block. The channel adapter 14 communicates the data block to the data buffer 18 that stores the data for subsequent read/write processing. The data buffer 18 in turn communicates the data block received from the channel adapter 14 to the read/write dataflow circuitry 20, which formats the device data into physically formatted data that may be recorded on a magnetic tape medium. The read/write dataflow circuitry 20 is responsible for executing all read/write data transfer operations under the control of the microprocessor controller 16. Formatted physical data from the read/write circuitry 20 is communicated to the tape interface system 24, which includes the one or more read/write heads of the head system 26 and appropriate drive motor components (not shown) for performing forward and reverse movement of the tape medium 28 mounted on a supply reel 30 and a take-up reel 32. The drive components of the tape interface system 24 are controlled by the motion control system 22 and the motor driver circuit 25 to execute such tape movements as forward and reverse recording and playback, rewind and other tape motion functions. In addition, in multi-track tape drive systems, the motion control system 22 transversely positions the read/write heads relative to the direction of longitudinal tape movement in order to record data in a plurality of tracks.

Figure 2:
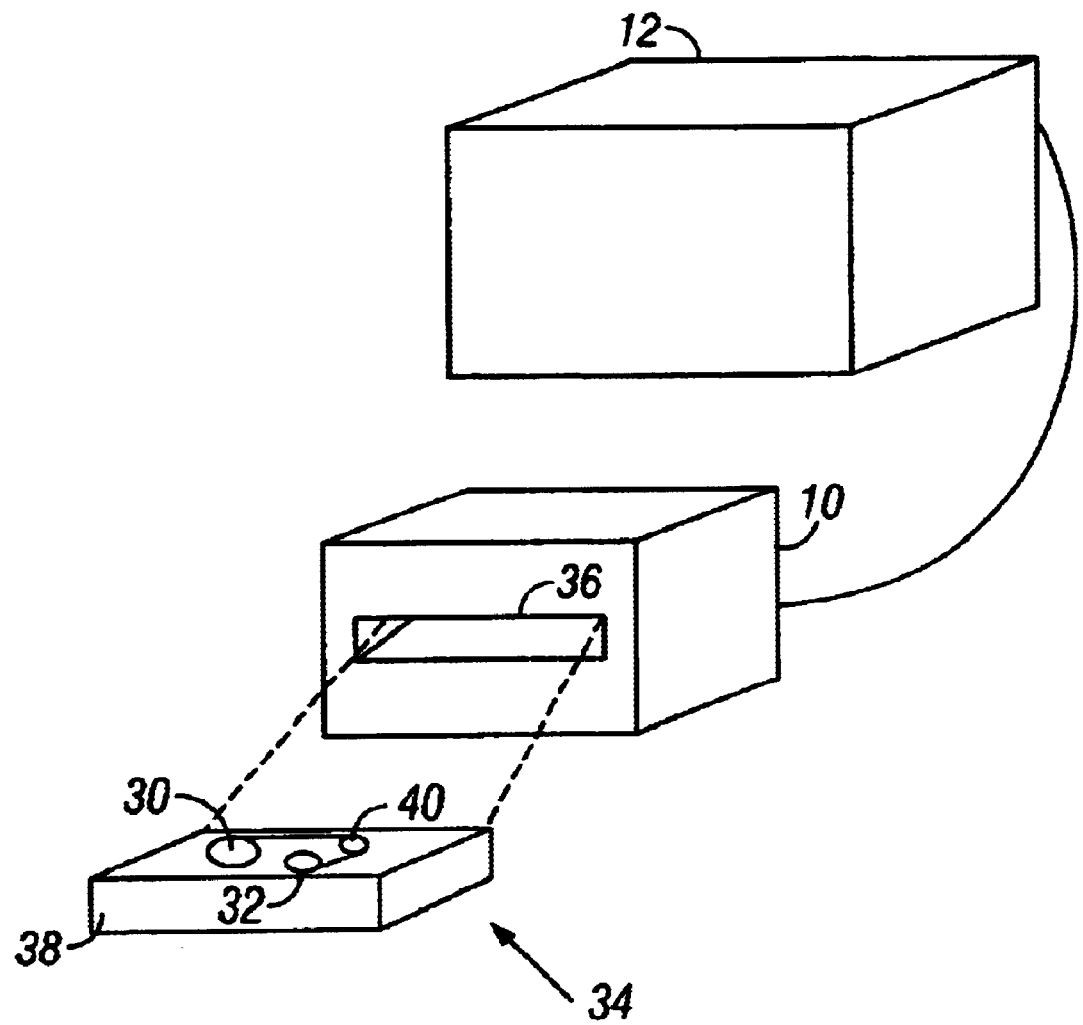
FIG. 2 is a perspective view showing an exemplary construction of the tape drive storage device of FIG. 1 for use with cartridge-based tape media.

In most cases, as shown in FIG. 2, the tape medium 28 will be mounted in a cartridge 34 that is inserted in the tape drive 10 via a slot 36 in the tape drive 10. The tape cartridge comprises a housing 38 containing the magnetic tape 28. The supply reel 30 and the take-up reel 32 are shown to be mounted in the housing 38, as is an exemplary capstan tape guide roller 40.

Figure 3:
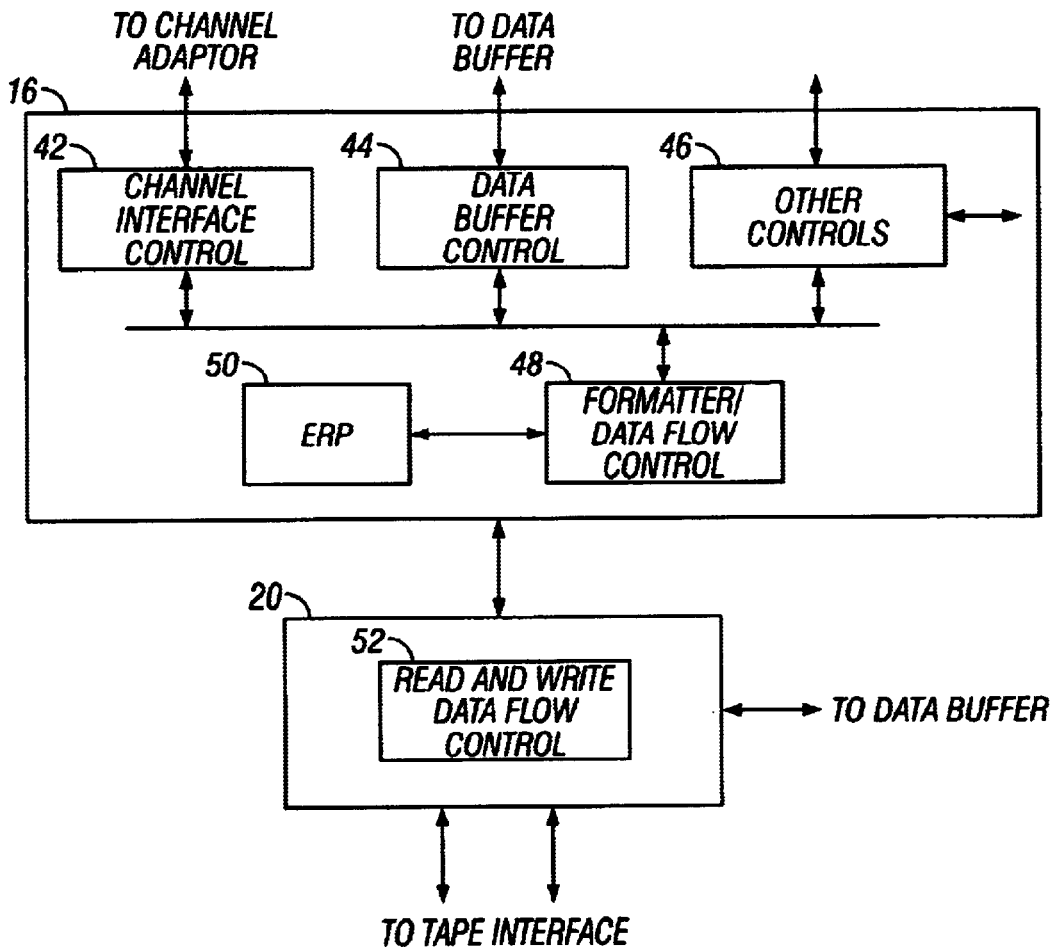
FIG. 3 is a functional block diagram providing an expanded view of selected components of the tape drive data storage device of FIG. 1.

Referring now to FIG. 3, components of the microprocessor controller 16 and read/write dataflow circuitry 20 are shown in greater detail. The microprocessor controller 16 can be implemented using one of a variety of conventional programmable processors, such as Hitachi Limited's SH3 micro-controller product or the like. The microprocessor controller 16 includes a channel interface controller 42 to implement the exchange of control information between the microprocessor controller 16 and the channel adapter 14. The microprocessor controller 16 further includes a data buffer controller 44 to implement the exchange of control information between the microprocessor controller 16 and the data buffer 18. Other controllers, illustrated collectively by reference number 46, are used to implement the exchange of control information between the microprocessor controller 16 and other components of the tape drive control and data transfer system, including the motion control system 22 and other components (not shown), as is known in the art.

Additional components contained within the microprocessor controller 16 include a formatter and dataflow control system 48 and an error recovery processing system 50, each of which is controlled by appropriate microcode routines of the microprocessor controller 16. The formatter and dataflow control system 48 directs operations of the read/write dataflow circuitry 20, as well as the data buffer 18 via the data buffer controller 44. The error recovery processing system 50 is programmed to perform conventional error recovery procedures when non-ECC correctable errors occur. The read/write dataflow circuitry 20 includes read/write dataflow control hardware 52 that oversees read/write dataflow operations.

Tape drive data storage system devices that read and record data on magnetic tape typically use servo control systems to properly position the read/write head(s) along data tracks extending in the transducing direction. To that end, timing based servo formatted media have been introduced to offer precise track following of the read/write heads, as well as accurate velocity control of the tape during operation. Such tape media are written with servo patterns in dedicated servo tracks on the tape during manufacture thereof under tightly controlled conditions so that variations in servo patterns are kept to a minimum. The servo patterns comprise bursts of magnetic flux transitions, extending across the servo track, that have different phases or frequencies.

A servo control system typically derives a position signal from dedicated servo magnetic read heads that read the servo patterns. Typically, the servo patterns have two timing patterns encoded in the signal. The servo read head follows the pattern, and hardware decodes the two separate timing signals and uses the ratio of the times to determine the position of the head relative to the data track.

Figure 4:
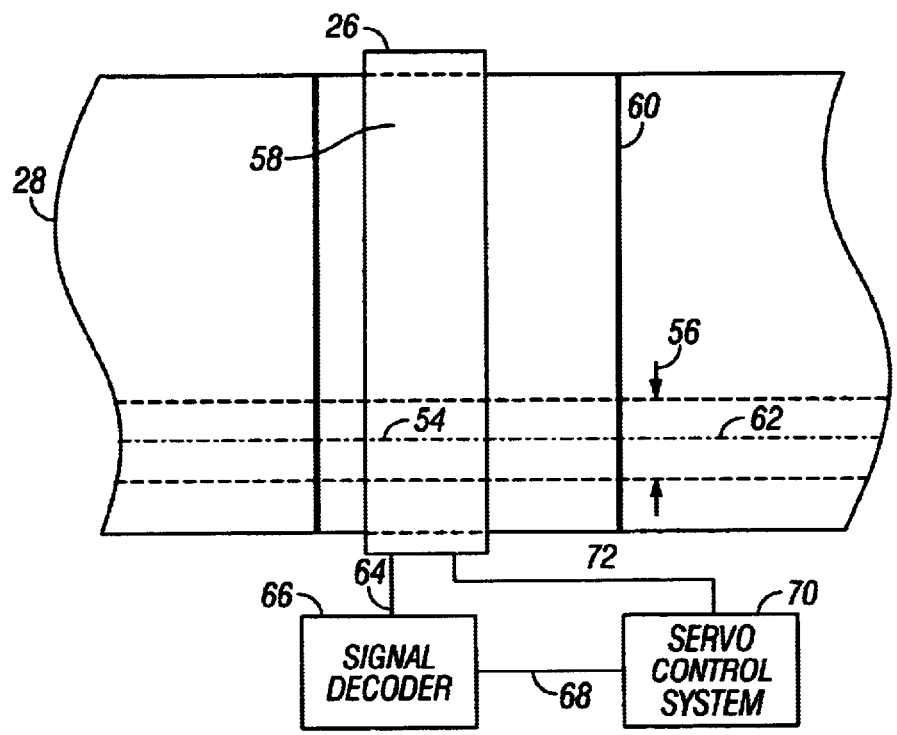
FIG. 4 is a schematic representation of a magnetic head and servo control system of the tape drive data storage device of FIG. 1.

FIG. 4 is illustrative of the foregoing. It is a view looking down on a portion of the magnetic tape medium 28 of FIGS. 1 and 2, past the head system 26 of the tape drive 10, which should be now understood to include servo control functionality provided by the components described below. The tape 28 is shown with dashed lines where it passes beneath the head system. The head system 26 is shown in solid lines and includes a relatively narrow servo head 54 that detects a servo pattern recorded in a servo track 56 of the tape 28. Also shown, for purposes of illustrating relative size, is a data read head 58 of the head assembly that is positioned over a data track region 60 of the tape containing multiple data tracks for reading data recorded in a data track. FIG. 4 shows a single servo read head and a single data read head for simplicity of illustration. Those skilled in the art to which the invention pertains will appreciate that most tape systems have multiple servo tracks, multiple servo read heads, and multiple data read and write heads.

In FIG. 4, the servo track centerline 62 is indicated, extending along the length of the tape 28. FIG. 4 shows that the servo read head 54 is relatively narrow and has a width substantially less than the width of the servo track 56. In particular, the servo read head 54 may have a width that is less than one-half the width of a single data track (not illustrated), which typically is much more narrow than a servo track. This is to allow for track following using different lateral index positions of the servo pattern to read and write multiple tracks using the same read/write elements.

In FIG. 4, the transducing direction of the head system 26 relative to tape movement, in which the servo read head 54 can read the servo pattern, occurs when the tape 28 is moved linearly with respect to the head system 26, along the length of the track 56. When such movement occurs, the servo pattern of magnetic flux transitions is detected by the servo read head 54 so that it generates an analog servo read signal that is provided via a servo signal line 64 to a signal decoder 66. The signal decoder 66 processes the servo read signal and generates a position signal that is delivered via a position signal line 68 to a servo control system 70. The servo control system 70 conventionally forms part of the motion control system 22 of FIG. 1. It generates a servo mechanism control signal 72 and provides this signal via a control line 74 to the head assembly 26. A servo mechanism (not shown) of the head system 26 responds to the servo control signal 72 from the servo control system 70 by moving the head system 26 so that the servo read head 54 is repositioned laterally across the width of the servo track 56 in the translating direction. The servo control system 70 monitors the position signal 68 from the signal decoder 66 and generates the servo control signal 72 necessary to reach the derived position.

Figure 5:
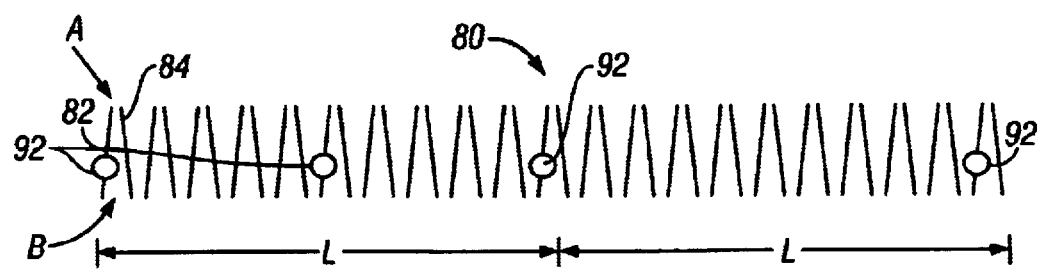
FIG. 5 is a representation of an exemplary set of servo patterns that may be used in accordance with the invention.

As noted above, servo patterns conventionally comprise magnetic flux transitions that extend across the width of the servo track such that the servo read head signal produced by reading the pattern varies continuously as the servo read head is moved across the width of each servo track. FIG. 5 shows a set of exemplary servo patterns 80. Those skilled in the art to which the invention pertains will recognize that the dark vertical bands, hereafter called stripes, represent magnetized areas of recorded magnetic flux that extend across the width of a servo track and that the edges of the stripes comprise flux transitions that are detected to generate the servo read head signal. The transitions have two magnetic polarities, one on each edge of a stripe. When the servo read head 54 crosses a transition, it produces a pulse whose polarity is determined by the polarity of the transition. For example, the servo read head 54 might produce positive pulses on the leading edge of each stripe (on encountering a stripe) and negative pulses on the trailing edge (on leaving a stripe). Each servo pattern 80 comprises a repeating sequence of different stripes having at least two orientations across the width of the servo track 56 such that the first orientation is not parallel to the second orientation. In FIG. 5, the servo patterns 80 each comprise angled first 82 and second 84 stripes that are placed side-by-side so as to form a repeating pattern of repeating "V's" along the length of tape 28. The servo read head 54 can be index positioned across the width of the servo patterns 80 to read or write multiple tracks using the same read/write head system. This is allowed because the nominal timing and space between the flux transitions of each servo pattern at each index position, which is lower at the bottom of the servo patterns (point "A" in FIG. 5) than at the top thereof (point "B" in FIG. 5), is known. Servo head adjustments can be made whenever the timing between servo patterns is lower or higher than nominal timing for a given index position.

The present invention makes use of the servo patterns conventionally recorded on magnetic tape media to derive information that can be used for tape tension control purposes. The assumptions underlying the invention are that a conventional servo pattern is dense enough to allow for adequate sample rate to control tension and that the timing based servo pattern is accurate enough to determine tape velocity over any time interval. It is further assumed that the nominal servo timing for each head system index position is known so that, for example, track following tension control can occur at the top of the servo patterns as well as at the bottom of the servo patterns.

Figure 6:
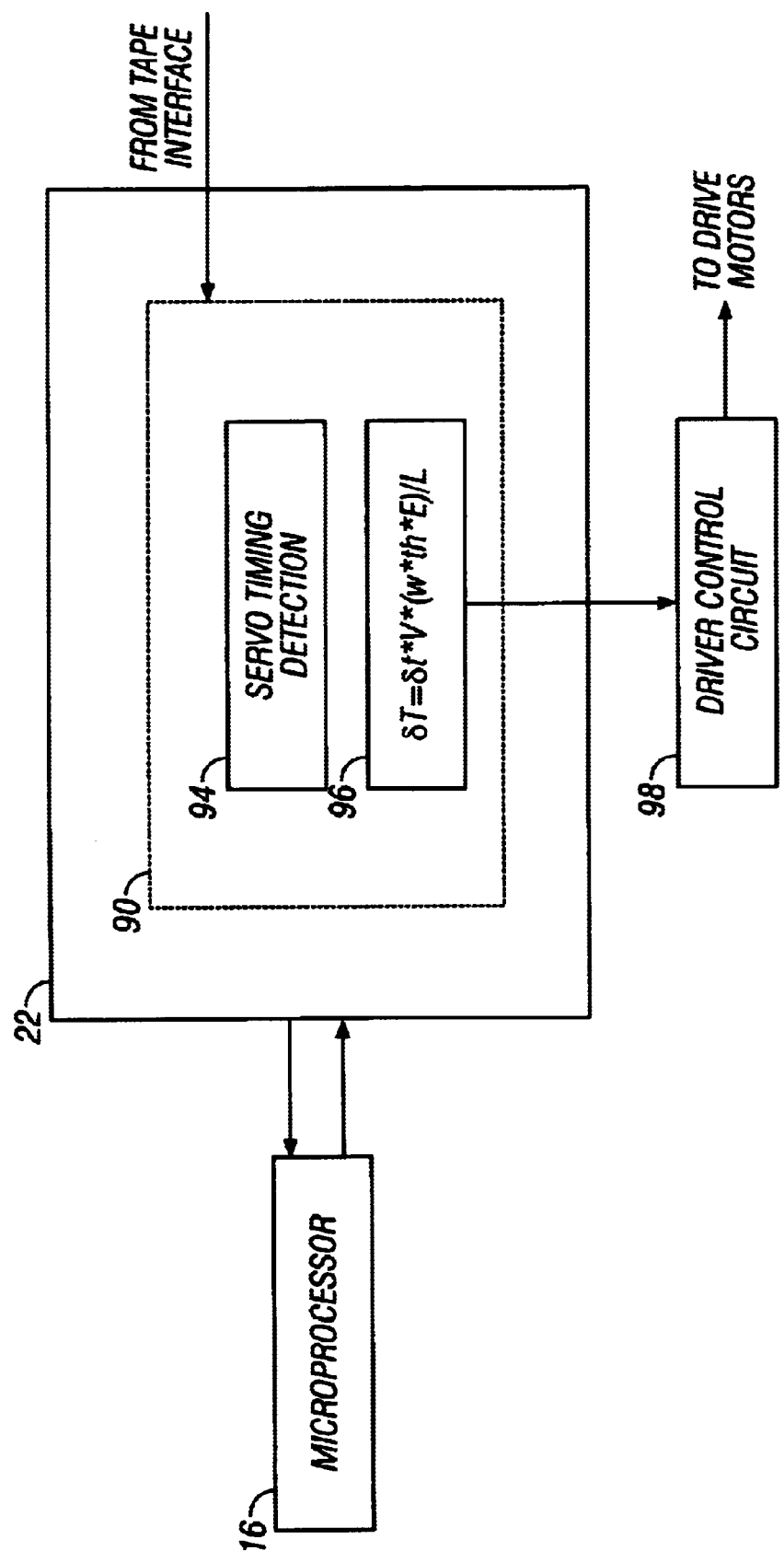
FIG. 6 is a block diagram showing an exemplary embodiment of a tape tension control system of a tape drive data storage device adapted for use with the present invention.

Turning to FIG. 6, the tension control system and method of the invention may be provided by a modified servo control system 90 that forms part of the motion control system 22. The modified servo control system 90 includes the conventional servo control functionality of the servo control system 70 of FIG. 4, as well as additional hardware, firmware, or software components (depending on design preferences) for implementing tension control, as will now be described. The theory underlying the tension control system herein described is that tape is an elastic material. As such, the free section between the supply reel 30 and the take up reel 32 will lengthen and contract according to changes in tape tension. Changes in tape length ($\delta L$) over a given length of tape L (strain) are a function of changes in tape tension ($\delta T$) and the tape's stiffness (modulus of elasticity), according the relationship: Strain; Stress/Stiffness. Stress is the change in tensile force on the tape ($\delta T$) divided by the tape cross-sectional Area (A). The tape's stiffness or modulus of elasticity is given by (E) and depends on the material used to manufacture the tape 28. From the foregoing stress versus strain relationship, it can be shown that the amount by which the tape 28 changes in length ($\delta L$) is proportional to the change in tension applied to the tape through the following equation:

$$\delta L = (\delta T * L)/(w * th * E), \quad (\text{Eq. 1})$$

where $\delta L$ is again the change in tape length from nominal, $\delta T$ is the change in tape tension from nominal, L is a predetermined length of tape between the take-up reel and the supply reel, w is the width of the tape, th is the thickness of the tape, and E is the tape's modulus of elasticity.

As shown in FIG. 5, the length L can be selected to be the distance between known servo pattern points 92 that are spaced from each other by a selected number of servo patterns 80 along the servo track 56 (see FIG. 4). The servo pattern points 92 could be represented by every fifth servo pattern 80, every tenth servo pattern 80, every one-hundredth servo pattern 80, and so on. Using components of a modified form of the servo control system 70, and particularly a servo rate detector 94, the time between successive servo pattern points (servo timing) can be derived from the position signal produced by the signal decoder 66 and a deviation ($\delta t$) from nominal timing for the current head system index position can be calculated. If the tape velocity (V) is known, the change in length ($\delta L$) of EQ. 1 between two servo pattern points along the tape can be represented as a function of the timing change through the following equation:

$$\delta L = \delta t * V, \quad (\text{EQ. 2})$$

where $\delta t$ is the change in time from nominal, $\delta L$ is the change in length term of EQ. 1, and V is the known velocity that the tape is traveling. From this relationship, the tension change in the tape medium 28 can be directly calculated by substituting Eq. 2 into Eq. 1 and solving for the change in tension through the following equation:

$$\delta T = \delta t * V * (w * th * E)/L. \quad (\text{EQ. 3})$$

The change in tension calculation of Eq. 3 is implemented in FIG. 6 by a tension calculating circuit 96 based on the $\delta t$ value provided by the servo rate detector 94. If tension adjustment is needed, the tension calculating circuit 96 outputs a tension control signal that is sent to a driver control circuit 98. The driver control circuit 98 in turn adjusts the electrical current to the motors that power the supply and take-up reels 30 and 32, so that the tape tension is adjusted.

Figure 7:
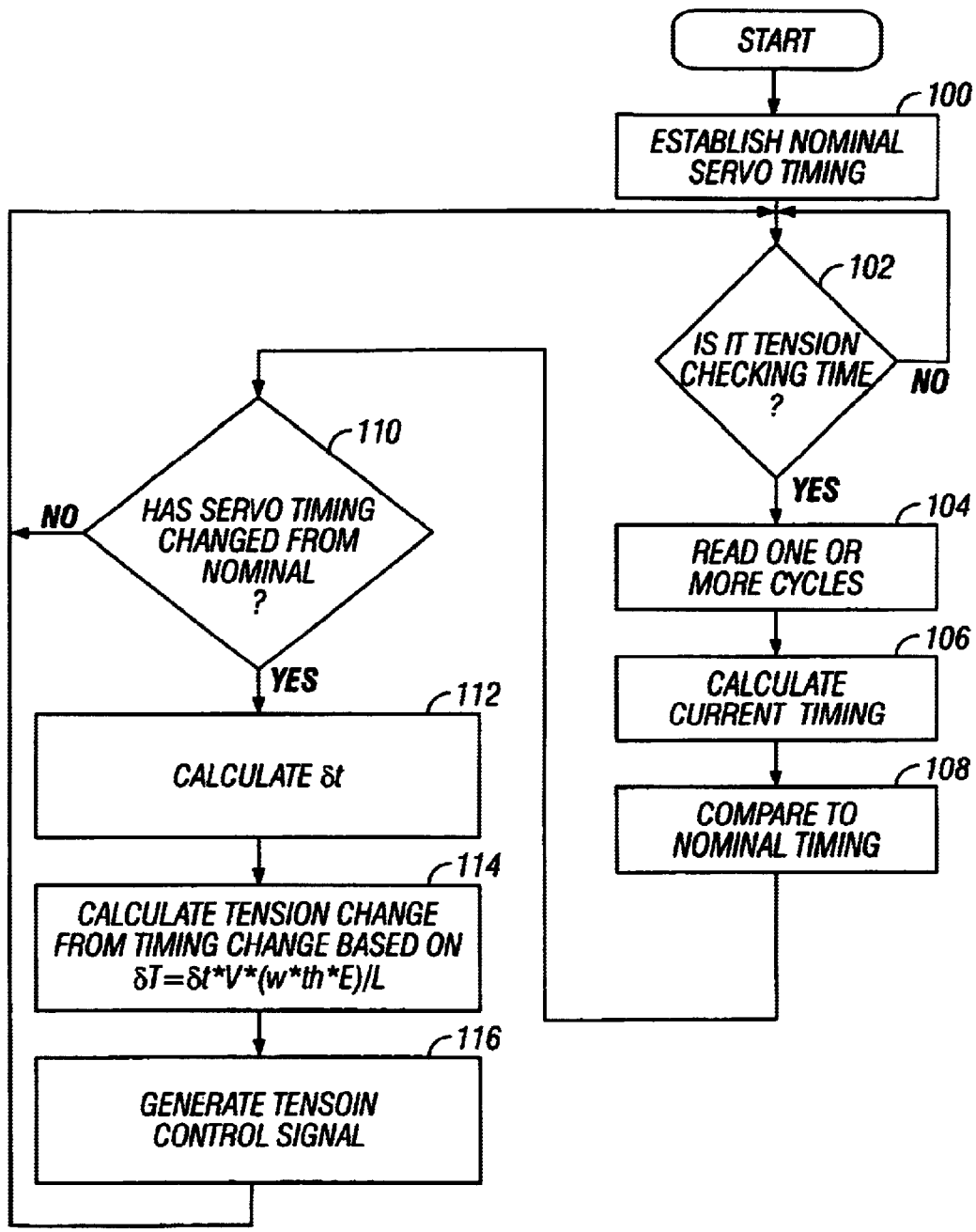
FIG. 7 is a flowchart showing exemplary method steps in accordance with the present invention.

Turning now to FIG. 7, a flow chart showing further details of tape tension adjustment is set forth. Beginning in a first step 100, a nominal servo signal timing value is ascertained for the current head system index position. In step 102, a test is made to determine whether tension testing time has arrived. In step 104, one or more cycles of servo pattern points are read to determine the current servo signal timing of the tape drive 10 (i.e., the elapsed time between two successive servo pattern points). In step 106, a timing value representing current servo timing is established. In step 108, a comparison is made between the current servo timing and the nominal servo timing. In step 110, a test is made to determine if the comparison result is non-zero. If it is not, control returns to step 102. If in step 110 it is determined that the servo timing has changed from nominal, the amount of change δt is calculated in step 112. Step 114 is then invoked to calculate the change in tension δT based on the calculated change in servo timing δt and Eq. 3. In step 116, a new tension control signal is established based on the calculated change in tension. The tension control signal is sent to the motor driver circuit 98, where current to the reel motors is adjusted to compensate for the change. Control then returns to step 102.

Accordingly, a system and method have been disclosed for controlling tape tension during operation of a tape drive by making use of pre-existing timing based servo patterns formatted on the media. While various embodiments of the invention have been shown and described, it should be apparent that many variations and alternative embodiments could be implemented in accordance with the teachings herein. It is understood, therefore, that the invention is not to be in any way limited except in accordance with the spirit of the appended claims and their equivalents.

What is claimed is:

1. In a tape drive, a tape tension control system for controlling the tension of a tape medium in said tape drive comprising:
    a servo signal decoder adapted to process signals representing sensed servo patterns on said tape medium;
    a servo timing detector adapted to determine servo timing based on said sensed servo patterns and to compare said servo timing against nominal servo timing information;
    a tape tension calculator adapted to calculate tape tension changes based on changes in said servo timing and to generate a tape tension control signal; and
    a motor driver circuit responsive to said tape tension control signal and being adapted to adjust tape tension to compensate for said tape tension changes.

2. A tape drive in accordance with claim 1 wherein said tape tension control system is implemented using a modified servo control circuit and said motor driver circuit.

3. A tape drive in accordance with claim 1 wherein said servo patterns are timing-based servo patterns.

4. A tape drive in accordance with claim 1 wherein said changes in servo timing are determined by comparing said determined servo timing with nominal servo timing for a current index position of a head system in said tape drive.

5. A tape drive in accordance with claim 1 wherein said servo rate detector is adapted to calculate said servo timing relative to servo pattern points separated by multiple servo patterns.

6. A tape drive in accordance with claim 5 wherein said tape tension changes are determined by using said servo timing changes, a known tape velocity and a known distance between said servo pattern points to determine tape strain, and by calculating said tape tension changes based on said tape strain and tape stiffness.

7. A tape drive in accordance with claim 1 wherein said tape tension changes are determined from said servo timing changes, tape stiffness, a cross-sectional area of said tape, and a nominal distance between said servo pattern points according to the relationship $\delta T = \delta t * V * (w * th * E)/L$, where δT is change in tape tension, δt is servo timing change, V is tape velocity, w is tape width, th is tape thickness, E is tape modulus of elasticity and L is distance between said servo pattern points.

8. A tape drive in accordance with claim 1 wherein said motor driver circuit is adapted to generate corrective drive motor control current from said tape tension control signal.

9. A tape drive in accordance with claim 1 wherein said motor driver circuit is adapted to control a rotational speed of supply and take-up reels on which said tape medium is mounted.

10. A tape drive in accordance with claim 1 wherein said servo patterns are pre-existing on said tape.

11. A method of controlling tape tension during operation of a tape drive comprising:
    sensing servo patterns on said tape medium;
    determining servo timing based on said sensed servo patterns;
    detecting tape tension changes based on changes in said servo timing; and
    adjusting said tape tension to compensate for said tape tension changes.

12. A method in accordance with claim 11 wherein said method is implemented using a modified servo control circuit and a motor driver circuit.

13. A method in accordance with claim 11 wherein said servo patterns are magnetic patterns.

14. A method in accordance with claim 11 wherein said changes in servo timing are determined by comparing said determined servo timing with predetermined nominal servo timing.

15. A method in accordance with claim 14 wherein said tape tension changes are determined from said change in distance, tape stiffness, a cross-sectional area of said tape, and a nominal distance between said servo pattern points according to the relationship $\delta T = \delta t * V * (w * th * E)/L$, where δT is change in tape tension, δt is servo timing change, V is tape velocity, w is tape width, th is tape thickness, E is tape modulus of elasticity and L is distance between said servo pattern points.

16. A method in accordance with claim 11 wherein said determination of servo timing includes calculating a time interval between known servo pattern points.

17. A method in accordance with claim 11 wherein said tape tension changes are determined by using said servo timing changes, a known tape velocity and a known distance between said servo pattern points to determine tape strain, and by calculate said tape tension changes based on said tape strain and tape stiffness.

18. A method in accordance with claim 11 wherein said tape tension adjusting includes generating a tape tension control signal based on said tape tension changes.

19. A method in accordance with claim 11 wherein said tape tension adjusting includes generating corrective drive motor control current from said tension control signal.

20. A method in accordance with claim 11 wherein said servo patterns are pre-existing on said tape.

21. In a tape drive, a tape tension control system for controlling the tension of a tape medium in said tape drive comprising:
    means for sensing servo patterns on said tape medium;
    means for determining servo timing based on said sensed servo patterns;
    means for detecting tape tension changes based on changes in said servo timing; and
    means for adjusting said tape tension to compensate for said tape tension changes.

22. A tape drive in accordance with claim 21 wherein said tape tension control system is implemented using a modified servo control circuit and a motor driver circuit.

23. A tape drive in accordance with claim 21 wherein said servo patterns are magnetic patterns.

24. A tape drive in accordance with claim 21 wherein said changes in servo timing are determined by comparing said determined servo timing with predetermined nominal servo timing.

25. A tape drive in accordance with claim 24 wherein said tape tension changes are determined from said change in distance, tape stiffness, a cross-sectional area of said tape, and a nominal distance between said servo pattern points according to the relationship $\delta T = \delta t * V * (w * th * E)/L$, where $\delta T$ is change in tape tension, $\delta t$ is servo timing change, V is tape velocity, w is tape width, th is tape thickness, E is tape modulus of elasticity and L is distance between said servo pattern points.

26. A tape drive in accordance with claim 21 wherein said means for determining servo timing comprises means for calculating a time interval between known servo pattern points.

27. A tape drive in accordance with claim 21 wherein said tape tension changes are determined by using said servo timing changes, a tape velocity and a known distance between said servo pattern points to determine tape strain, and by calculate said tape tension changes based on said tape strain and tape stiffness.

28. A tape drive in accordance with claim 21 wherein said tape tension adjusting means include means for generating a tape tension control signal based on said tape tension changes.

29. A tape drive in accordance with claim 21 wherein said tape tension adjusting means include means for generating corrective drive motor control current from said tension control signal.

30. A tape drive in accordance with claim 21 wherein said servo patterns are pre-existing on said tape.

* * * * *

UNITED STATES PATENT AND TRADEMARK OFFICE
CERTIFICATE OF CORRECTION

| | |
|---|---|
| PATENT NO. | : 6,934,108 B2 |
| APPLICATION NO. | : 10/349307 |
| DATED | : August 23, 2005 |
| INVENTOR(S) | : David H. Harper and Mark A. Taylor |

It is certified that error appears in the above-identified patent and that said Letters Patent is hereby corrected as shown below:

In claim 5, line 2 col. 7, change "servo rate detector" to --servo timing detector--;

In claim 7, line 4 col. 7, change "said servo pattern points" to --known servo pattern points--;

In claim 11, line 1 col. 8, change "said tape medium" to --a tape medium--;

In claim 15, lines 2-3 col. 8, change "said change in distance" to --said changes in servo timing--;

In claim 15, line 4 col. 8, change "said servo pattern points" to --known servo pattern points--;

In claim 17, line 1 col. 8, change "claim 11" to --claim 16--;

In claim 17, line 5 col. 8, change "calculate" to --calculating--;

In claim 19, line 1 col. 8, change "claim 11" to --claim 18--;

In claim 25, lines 2-3 col. 9, change "said change in distance" to --said changes in servo timing--;

In claim 25, line 4 col. 9, change "said servo pattern points" to --known servo pattern points--;

In claim 27, line 1 col. 10, change "claim 21" to --claim 26--;

In claim 27, line 5 col. 10, change "calculate" to --calculating--;

UNITED STATES PATENT AND TRADEMARK OFFICE
CERTIFICATE OF CORRECTION

PATENT NO. : 6,934,108 B2
APPLICATION NO. : 10/349307
DATED : August 23, 2005
INVENTOR(S) : David H. Harper and Mark A. Taylor It is certified that error appears in the above-identified patent and that said Letters Patent is hereby corrected as shown below:

In claim 29, line 1 col. 10, change "claim 21" to --claim 28--.

Signed and Sealed this

Eighteenth Day of March, 2008

JON W. DUDAS
*Director of the United States Patent and Trademark Office*